May 2, 1967  T. BOWLING  3,317,708
DOOR LATCHING MECHANISM FOR OVEN CAVITY
Filed May 4, 1964  3 Sheets-Sheet 1
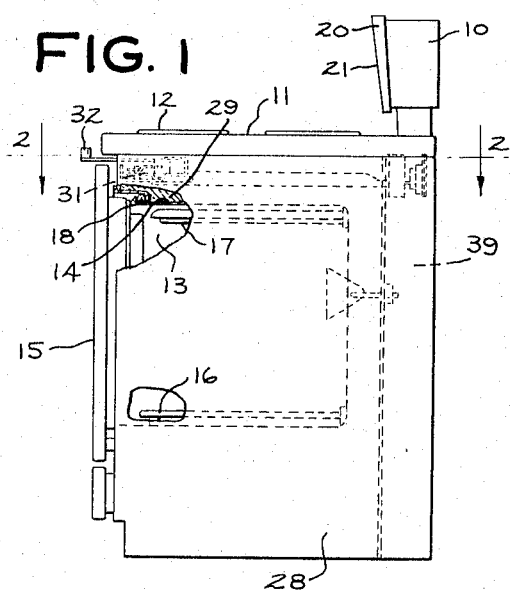
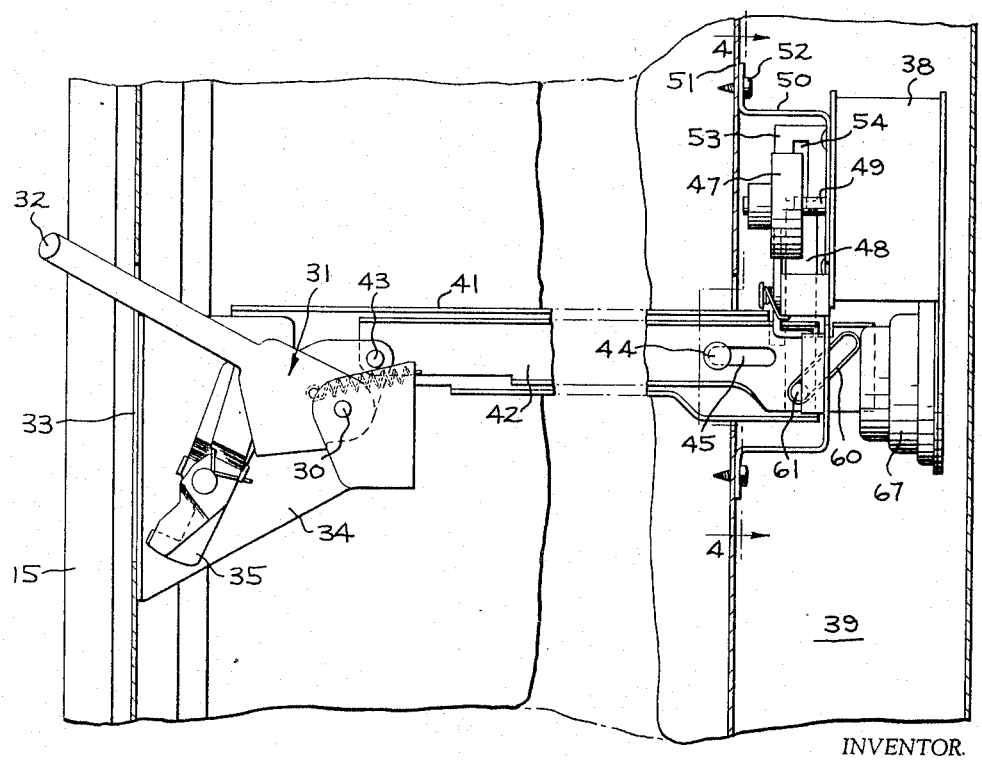
INVENTOR.
TEAMUS BOWLING
BY Richard L. Caslin
HIS ATTORNEY

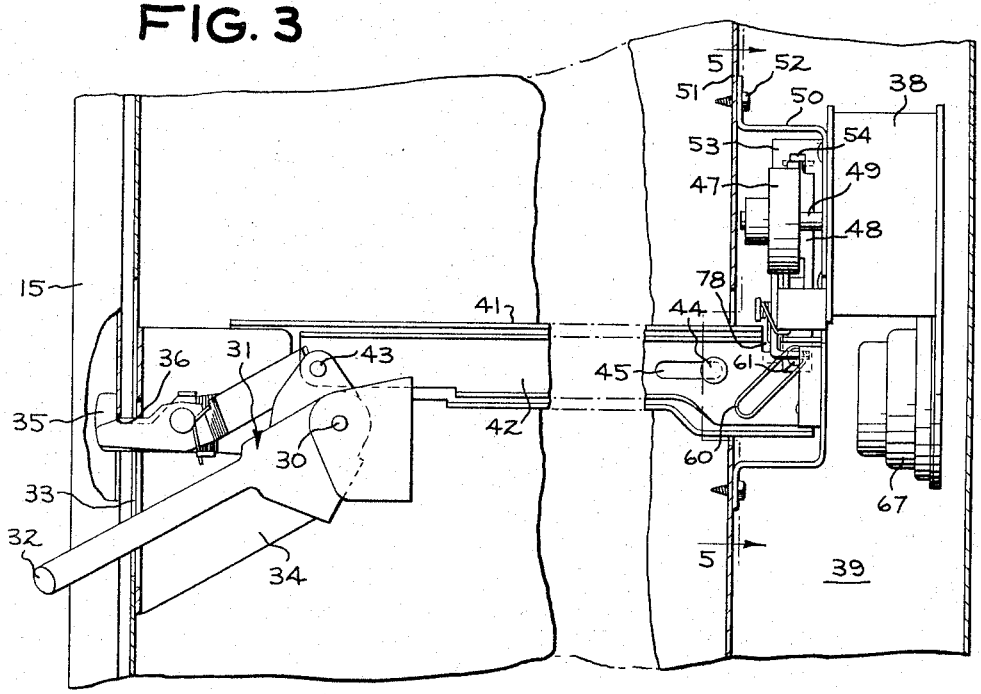
FIG. 3
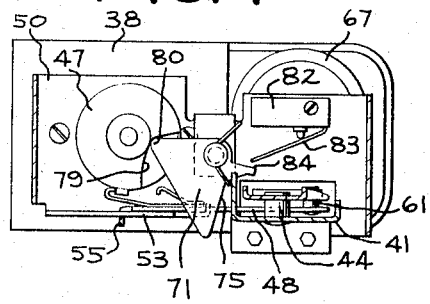
FIG. 4
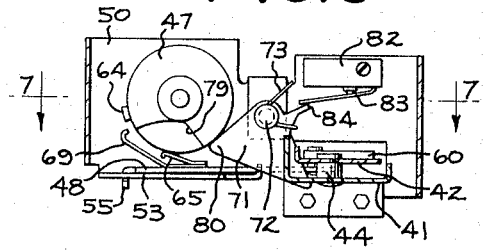
FIG. 6
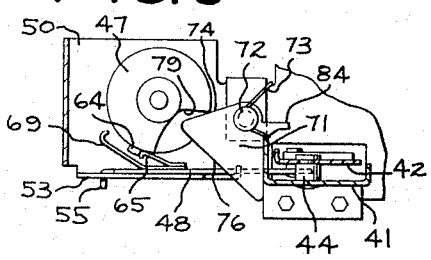
FIG. 5
FIG. 7
INVENTOR.
TEAMUS BOWLING
BY Richard L. Cashn
HIS ATTORNEY

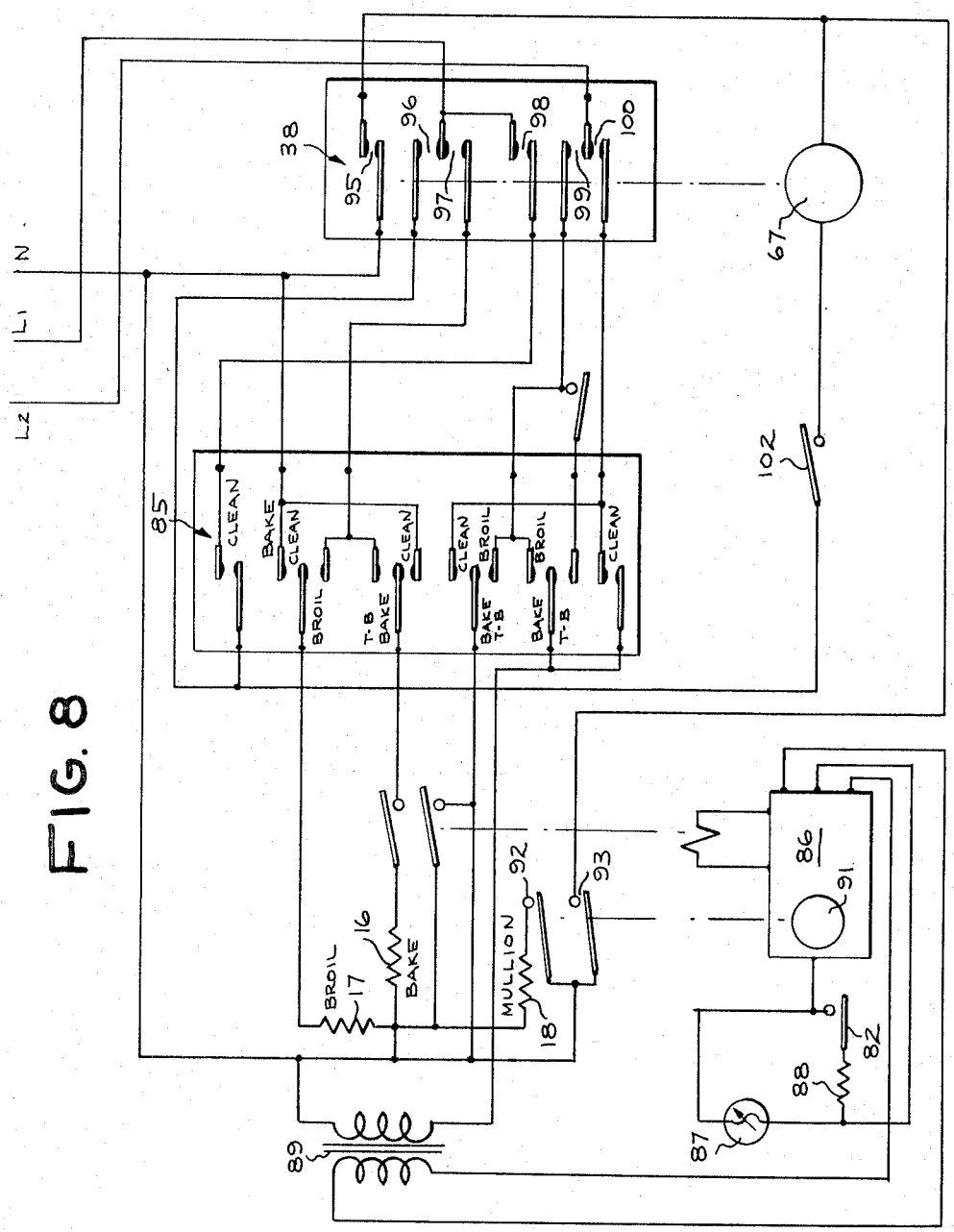

3,317,708
DOOR LATCHING MECHANISM FOR OVEN CAVITY

Teamus Bowling, Fern Creek, Ky., assignor to General Electric Company, a corporation of New York
Filed May 4, 1964, Ser. No. 364,481
3 Claims. (Cl. 219—412)

The present invention relates to a locking means for a door latching mechanism and particularly such a mechanism for use with a door of a high temperature domestic cooking oven of the type having an automatic heat cleaning cycle as is described and claimed in Patent No. 3,121,158 of Bohdan Hurko granted on Feb. 11, 1964 and assigned to the General Electric Company, the assignee of the present invention.

Such a high temperature oven would have the normal cooking functions of baking and broiling within a temperature range between about 150° F. and 550° F., as well as a heat cleaning operation where the temperature is raised to a maximum somewhere between 750° F. and 950° F. for removing the food soil and grease spatter that accumulates on the walls of the oven liner during normal cooking. Such a reaction may be characterized by the term "pyrolysis" which is defined as the chemical decomposition of matter by the application of heat.

Undoubtedly, the major annoyance in using an oven for cooking is the difficulty encountered in keeping the walls of the oven liner clean after repeated usage. It is unavoidable that food particles and grease spatterings will accumulate and become baked on the hot oven surfaces during normal cooking operations. Strong chemical cleaning agents have been devised and are commercially available for the express purpose of removing food soil of this type under these conditions. However, even the best of these cleaning agents require a a strong rubbing action, and a great deal of time and energy to complete the task satisfactorily. Also, there exists a safety hazard that the chemicals might cause injury to the user's hands or eyes if the directions for use are not followed verbatim.

Once the principle of automatic heat cleaning of domestic ovens by the method of pyrolysis was perfected many different systems of applying the heat and controlling the cleaning operation were devised to obtain the optimum results. In order to gain the maximum reliability, standard components were used to take advantage of the years of engineering development and know-how gained by working with the components, and where possible they were arranged in fail-safe combinations so that after years of trouble-free usage of the oven any failure of a component would not constitute a safety hazard. Instead, the failure of such a component would merely render inoperative the heating circuit or mechanical function in which the component operates.

The principal object of the present invention, therefore, is to provide a locking means for the latching mechanism of a door of a high temperature oven where said locking means is controlled by a program timer to become effective before the oven temperature rises above normal cooking temperatures so as to require the locking of the door and prevent the unlocking of the door until the completion of a heat cleaning cycle when the oven temperature has returned to within the maximum cooking temperaturer range of about 550° F.

A further object of the present invention is to provide a door latching system of the class described where the program timer is started by the closure of the door latching mechanism thereby insuring that the oven door is latched before the heat cleaning cycle can be initiated.

A further object of the present invention is to provide a latching system for an oven door of the class described wherein a program timer is capable of a reversible action during a short time interval at the beginning of the c ycle to permit the user to change his mind and the door latch to be opened, where the passing of this time interval will render the timer irreversible and necessitate the completion of the timer cycle before the oven door may be unlatched.

A still further object of the present invention is to provide a locking means in juxtaposition with the door latching mechanism and controlled by a program timer for disabling the door latching mechanism after the short initial interval of reversibility and until the oven temperature returns to the normal cooking temperature range.

The present invention, in accordance wih one form thereof, is embodied in a high temperautre domestic oven which may be heated either by electricity or gas. As in standard ovens, the oven cavity is formed by an insulated box-like oven liner and an access door. A door latching mechanism is provided to hold the access door in a closed position during a high temperature heat cleaning cycle. Associated with the door latching mechanism is a program timer that is started upon the closure of the door latching mechanism. The timer serves as a control means for the source of heat of the oven thereby controlling the initiation and the length of time the heating source is energized. There is a short time interval at the beginning of the timer cycle within which it is possible to reverse the timer by simply opening the door latching mechanism. After this time interval has elapsed, the timer becomes irreversible and must complete its cycle before the door latching mechanism may be opened. A locking means is associated with the door latching mechanism and controlled by the program timer for disabling the door latching mechanism after the short interval of reversibility. This locking means is withdrawn from the door latching mechanism after the completion of the heat cleaning cycle and the return of the oven temperature to within the maximum normal cooking temperautres of about 550° F. thereby freeing the door latching mechanism for manual operation before the timer is deactivated.

My invention will be better understood from the following description taken in conjunction with the accompanying drawings and its scope will be pointed out in the appended claims.

FIGURE 1 is a right side elevational view of a free-standing electric range with parts broken away to show the main elements of an oven having an automatic heat cleaning feature that embodies the present invention.

FIGURE 2 is a fragmentary plan view on an enlarged scale taken on the line 2—2 of FIGURE 1 to show the nature of the door latching mechanism and the program timer located at the back of the oven that is associated with the latching mechanism and controls the heat cleaning cycle. The door latching mechanism is shown in its open or unlocked position.

FIGURE 3 is a fragmentary plan view similar to that of FIGURE 2 showing the door latching mechanism in its closed or locked position.

FIGURE 4 is a fragmentary transverse elevational view in cross-section taken along the line 4—4 of FIGURE 2 at the back of the oven for an understanding of an inter-relation between the door latching mechanism, the program timer and the locking means for the door latching mechanism during normal cooking operations.

FIGURE 5 is a transverse elevational view similar to that of FIGURE 4 showing the door latching mechanism in the closed position and taken on on the lines 5—5 of FIGURE 3 when the program timer has just been started and is within the short interval time when the timer is reversible by the simple action of opening the door latch mechanism.

FIGURE 6 is a transverse cross-sectional elevational view similar to that of FIGURES 4 and 5 with the door latching mechanism in its closed position and the timer having completed its short time interval of reversibility and being in its irreversible condition requiring the completion of the timer cycle before the door latching mechanism can be manually operated.

FIGURE 7 is a fragmentary plan view of the mechanism of FIGURE 6 taken on the line 7—7 of FIGURE 6 with the starting wheel removed.

FIGURE 8 is a schematic diagram of both the power and control circuits for an electric heating system of an oven encompassing the present invention.

Turning now to a consideration of the drawings, and in particular to FIGURE 1 there is shown for illustrative purposes a free-standing electric range 10 having a top cooking surface or cooktop 11 with a plurality of surface heating elements 12, an oven cavity 13 formed by a box-like oven liner 14 and a front-opening drop door 15. The oven cavity is supplied with two standard heating elements; namely, a lower baking element 16 and an upper broiling element 17. A third heating element 18 has been added adjacent the oven door 15 to replenish the heat lost in this area and thereby retain generally uniform oven wall temperatures. This third heater 18 is identified as a mullion or perimeter heater that is wrapped around the outside of the oven liner; for example, in a manner that is taught by the Newell Patent 3,017,488 which is assigned to the General Electric Company, the assignee of the present invention.

The range is provided with a raised backsplash 20 that is vertically arranged along the back edge of the cooktop 11 and provided with an instrument or control panel 21 in its front face. This control panel contains most of the controls of the range for both the surface heating elements 12 as well as for the oven compartment 13 as is well understood in this art. Other structural features that might be mentioned by name in passing would be the outer range body or cabinet 28 which has an outer appearance finish of porcelain enamel or the like, and which serves as the superstructure that supports and encloses the various parts of the range. Sandwiched between the oven liner 13 and the range body or cabinet 28 is an extra thick blanket of thermal insulating material 29 such as fiberglass or the like. The amount of insulation being used has been increased over the amount of insulation in standard ovens because of the high operating temperatures encountered during the heat cleaning operation which may reach a maximum oven air temperature somewhere between 750° F. and 950° F. although preferably at an intermediate level of about 880° F.

It has been found necessary to provide a latching means for the oven door 15 to insure that the oven door is first closed and cannot be opened while the oven is being operated in a heat cleaning cycle. A suitable door latching mechanism is identified as element 31 in FIGURES 1 and 2, although it is best described in the copending patent of Clarence Getman, 3,189,375 which is assigned to the General Electric Company, the assignee of the present invention. Accordingly, only brief mention will be made here of the specific details of this mechanism as it does not form part of the present invention. The latching mechanism includes a manually operable handle lever 32 which extends through an elongated slot 33 in the front edge of the cooktop 11 in a position just above and parallel to the top edge of the oven door 15. Referring to FIGURE 2, the handle lever 32 is pivotally supported about a vertical pivotal axis 30 to swing in a horizontal plane between the unlocked position of FIGURE 2 to the locked position of FIGURE 3. Accordingly, it can be seen that the handle lever has a stroke or angle of operation of about 60°. Rather than confuse the reader with details of the specific mode of operation of this door latching mechanism it should suffice to say that there is an assemblage of a mounting bracket 34, a handle lever 32, and a swinging hook member 35 which is normally recessed within the range body as shown in FIGURE 2 and swings out to engage a keeper 36 at the inner surface of the oven door when the door is to be locked. There are several pin and cam slot connections made between the innermost end of the hook member 35 and the innermost end of the handle lever 32, but these connections are not shown for purposes of simplicity in explaining the present invention which is to follow.

Associated with the door latching mechanism 31 but at the back of the oven is a program timer 38 which serves to energize and control the length of time of energization of the heating means for the oven cavity. This timer is positioned at the very back of the oven outside of the insulation 29 and within a closed wiring compartment 39 that constitutes the back portion of the range. This is in an area of low ambient temperature so as to protect the electrical elements of the timer and related parts from damage due to excessive heat. The timer 38 is provided with a driving motor 67 and they are directly supported on a hat-shaped bracket 50 formed on the end of an elongated support bracket 41 that extends rearwardly from the mounting bracket 34 of the latching mechanism 31. In other words, this is a sub-assembly comprising three mounting brackets 34, 41 and 50 which serve to combine the functions of the latching mechanism 31 and the program timer 38. A reciprocating connecting rod 42 rests along the length of the elongated bracket 41. At its forward end the connecting rod is fastened by a pivot pin 43 to the innermost end of the handle lever 32, while the rearward end is guided by a pin and slot connection 44 and 45 respectively in its movement on the support bracket 41. There is a fixed vertical pin 44 extending upwardly from the top face of the support bracket 41, while there is an elongated slot 45 extending longitudinally of the connecting rod 42 and which receives the vertical pin 44 so as to guide the reciprocating movement of the connecting rod in a straight line manner.

The program timer 38 is adapted to be started when the latching mechanism 31 is moved from its open position of FIGURE 2 to its closed position of FIGURE 3. Hence, there must be a mechanical connection of some kind between the latching mechanism 31 and the timer 38. This connection is made between the rearmost end of the connecting rod 42 and a starting wheel 47 by a transverse slider 48 as is best seen in FIGURES 2 and 4. The program timer 38 is located off to one side of the connecting rod 42, and it has a forwardly protruding shaft member 49 on which the starting wheel 47 is mounted in the manner of a rotary knob on a conventional timer. The slider 48 underlies both the end of the connecting rod 42 and the starting wheel 47, and it is guided for straight line reciprocating motion. As mentioned previously, the timer 38 is attached to a mounting bracket 50 and it is adapted to be fastened to a back panel 51 of the oven as by fastening screws 52. This mounting bracket includes a horizontal ledge 53 which underlies the starting wheel 47 and contains an elongated slot 54. The slider 48 has a bent tab 55 at one end which protrudes through the slot 54 and has underlying portions which prevent the separation of the slider from the slot 54 in the ledge 53. Comparing both FIGURES 4 and 7, the slider 48 is provided with a second guiding means with relation to the ledge 53 by way of an elongated slot 57 in the slider, and a bent up tab 58 at the right side of the ledge 53 for confinement within the slot.

As for a driving means for this slider 48, there is a diagonal cam slot 60 in the connecting rod 42 and it is adapted to receive a cam follower or pin 61 that is supported near the end of the slider 48 and extends upwardly therefrom. Now comparing the open position of the latch mechanism 31 in FIGURE 2 with the closed position of the mechanism in FIGURE 3, it will be noted that the cam follower 61 has moved from one end of the diagonal slot 60 to the other, and it should be appreciated that in so doing the slider 48 moves in unison. For example, the closing of the latching mechanism will cause the slider 48 to move away from the connecting rod 42 and to underlie the starting wheel 47 as can be seen by comparing the positions of the slider 48 in FIGURES 4 and 5.

The purpose of the slider 48 is to exert a turning force on the starting wheel 47 of the timer. This is made possible by fashioning an ear 64 to the periphery of the wheel and assembling a leaf spring 65 to the top surface of the slider for engaging the ear and exerting a pushing action as is best seen in FIGURE 5 for turning the starting wheel 47 in a clockwise direction through a slight angle of about 15°. It should be understood that this slight rotation of the starting wheel 47 is enough to set the timer into operation by closing internal switch contacts (not shown) which would energize the driving motor 67. Instead of manually setting the timer by grasping the starting wheel 47 by the hand and turning the wheel, it is done remotely when the latching mechanism 31 is moved to its locked position of FIGURE 3.

It is appreciated that there might be times when the housewife will set the oven controls into a heat cleaning cycle and then will change her mind because she might have left some cooking utensil in the oven inadvertently or she might have need for using the oven before the normal heat cleaning cycle would be terminated. Thus, she might elect to postpone the oven cleaning until a more convenient time. The present invention provides a short grace period of about ten minutes at the beginning of the cycle during which time it is possible to unlock the door and thereby reset the timer to its OFF position without going through a complete cycle. This opportunity is afforded by a second leaf spring 69 which has an upwardly turned hook end for engaging the ear 64 of the starting wheel 47 so that when the slider 48 is moved in a reverse direction, to the right, the hook will engage the ear 64 and drag the starting wheel 47 with it until the wheel returns to the starting position shown in FIGURE 4. In the event the housewife does not change her mind and unlock the door, the starting wheel will continue on its clockwise movement as is best seen in FIGURE 6. After the short grace period, the ear 64 will move out of the range of the second leaf spring 69 thereby rendering the timer irreversible and requiring the timer to run its course until entrance can be gained to the oven cavity.

Next to be considered is the means for locking the door latching mechanism 31 in its closed position of FIGURE 3 before the initiation of the heat cleaning cycle to insure that the oven door cannot be opened while the oven temperature is above the normal maximum cooking temperatures of about 550° F. This locking arrangement is provided by a pivoted locking bolt 71 that is interposed between the starting wheel 47 of the timer and the connecting rod 42 of the latching mechanism 31. This locking bolt 71 is pivotally mounted about a horizontal axis or pivot pin 72, and it is provided with a torsion spring 73 so that it is normally biased in a clockwise direction away from the connecting rod 42. This locking bolt 71 is a plate member of generally triangular shape that is formed by the three sides 74, 75 and 76 where the pivot pin 72 is at the apex of sides 74 and 75. The side edge 75 is adapted to fit into a notch 78 formed in the adjacent side edge of the connecting rod 42 as is best seen in FIGURES 6 and 7.

In order for the locking bolt 71 to make engagement within the notch 78, it is necessary for the bolt to be moved by a recessed cam surface 79 of generally arcuate shape that is cut into one side of the periphery of the starting wheel 47 as is best seen in FIGURES 4–6. The side edges 74 and 76 of the bolt 71 form an apex or tip 80 which is adapted to serve as a cam follower acting with the recessed cam surface 79 as can be understood by comparing FIGURES 4 and 5. Once the ten minute grace period has passed, the side edge 74 of the locking bolt 71 rides out of the recessed cam and the periphery of the starting wheel 47 acts against the side edge 74 of the locking bolt and holds the bolt in its locked position of FIGURE 6. This continues until just shortly before the starting wheel 47 makes a complete revolution at which time the bolt 71 will slide back into engagement with the recessed cam surface 79 thereby allowing the bolt to pivot away from the notch 78 and thereby disengage itself from the connecting rod 42. Once this has taken place, the timer will have completed its cycle, and the timer motor will then become de-energized.

Notice there is a switch means 82 mounted on the bracket 50 just above the innermost end of the connecting rod 42 and in alignment with the locking bolt 71. This switch has an actuator arm 83 that is adapted to be engaged by a finger 84 extending from the locking bolt 71 so that the switch is closed once the locking bolt is moved into locking engagement with the notch 78 of the connecting rod 42. This switch means 82 is an interlock switch which must be closed before the heating circuit of the high temperature cleaning cycle can be energized, as will be explained in detail later.

Turning now briefly to a consideration of the circuit diagram of FIGURE 8, the electric range of the present invention is provided with a standard electrical service of three-wire Edison source of power nominally of 240 volts, single phase, 60 cycle, A.C. which is usually available in the average residence having adequate wiring. This voltage source has a pair of line wires L1 and L2 and a grounded neutral conductor N for supplying an oven selector switch 85 that controls the electrical load characterized by the three heating elements; namely, the bake element 16, the broil element 17, and the mullion or perimeter heater 18. Associated with the power circuit is a low voltage temperature control circuit that embodies an electrical thermostatic control system of the general type that is taught in the Baker Patent No. 2,962,-575 and having a responder 86 and a variable-resistance temperature sensor 87 in heat transfer relation with the oven cavity, a biasing resistor 88 to shift the control point of this circuit so that normal cooking temperatures as well as higher temperatures can be obtained with accurate results including the heat cleaning temperature range somewhere between 750° F. and 950° F. This temperature control circuit is a low voltage circuit that is fed from a step-down transformer 89. Such a temperature control system is taught and claimed in the recently issued Patent No. 3,122,626 of Stanley B. Welch which is assigned to the General Electric Company, the assignee of the present invention. The responder 86 has a rotary dial 91 which is manually adjustable to obtain the various cooking temperatures as well as to set for the cleaning operation. The responder has a pair of internal switch contacts shown as contacts 92 and 93 which are open during normal cooking operations and closed during the cleaning cycle.

The oven selector switch 85 is shown with a plurality of switch contacts and these are labeled with designations of specific operations such as Clean, Bake, Broil, Time Bake which means that the related contacts are closed during such operations.

Also illustrated is the program timer 38 with its drive motor 67. The timer includes a series of switch contacts 95–100. Certain of these contacts are closed during normal cooking operations such as contacts 97 and 99, and they are open during the cleaning cycle. The remaining contacts 95, 96, 98 and 100 are closed for a predetermined time that is measured for example ten minutes after the oven door is latched by the latching mechanism 31 until the end of the cycle, for example, 174 minutes later. At the end of 174 minutes the closed contacts are opened and the open contacts are closed; in other words, the program timer is set to its OFF position or rather its normal cooking position allowing the selector switch 85 to control the two oven heating units 16 and 17.

Notice that the door lock switch 82, which cooperates with the pivoted locking bolt 71, is in the temperature control circuit and it serves in series with the biasing resistor 88 to connect the resistor across the variable-resistance temperature sensor 87. Moreover, there is a door switch 102 that is mounted in the door frame of the range body and connected in series with the timer motor 67, and this switch is closed by the closure of the oven door 15. This switch 102 insures that the heat cleaning cycle cannot be set into motion even though the door latching mechanism 31 is closed if the door switch 102 and hence the oven door 15 is not also closed.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A door latching mechanism adapted for locking a door, a door and a door frame where the door is hingedly mounted to the door frame along one edge thereof, said latching mechanism being supported within the door frame adjacent the distal edge of the door and including a handle lever connected to a swinging hook member that is capable of grasping the door when the handle lever is moved to the closed position, a connecting rod pivoted to the handle lever and supported for reciprocating movement as the handle lever moves between the open and closed positions, an electrical timer associated with the connecting rod and having motor means that is adapted to be started once the handle lever is moved to its closed position, said timer including a starting wheel that is adapted to be motor-driven once the motor means is energized, a slider interposed between the connecting rod and starting wheel and being capable of shifting the starting wheel to a position for energizing the timer motor means when the handle lever is closed, and a movable locking bolt interposed between the starting wheel and the connecting rod, said starting wheel including a cam surface cooperating with the locking bolt and governing the position thereof, said connecting rod including a keeper portion engageable by the locking bolt, whereby the movement of the handle lever to the closed position serves to cause the slider to shift the starting wheel to a position that energizes the timer motor means, said motor means driving the starter wheel through a predetermined cycle, the said cam surface of the starting wheel serving after a short time interval to shift the locking bolt into engagement with the keeper portion of the connecting rod, as well as to withdraw the locking bolt from engaging the connecting rod toward the end of the cycle and shortly before the timer motor is deenergized so that the handle lever may only be opened at the completion of the operating cycle of the timer.

2. A heated cavity formed by an insulated box-like body and an access door for closing and sealing said cavity, and electrical heating elements for raising the temperature within the cavity, selector switch means for arranging the heating means in various circuits of different wattages for normal operating temperatures, as well as for energizing the heating elements in a high temperature cleaning cycle, and a door latching mechanism mounted on the body and movable between open and closed positions for holding the door in a closed position, said door latching mechanism including a reciprocating connecting rod that moves whenever the position of the door latch mechanism is changed, and safety means for insuring the latching of the access door before the cleaning cycle can be initiated, said safety means including an electrical motor-driven program timer which when started initiates and controls the length of the high temperature cleaning cycle, said timer including a starting member that is adapted to be moved from an OFF to a starting position for energizing the timer motor, an intermediate member joined to the connecting rod and located between the connecting rod and the starting member for effecting the initial movement of the starting member when the door latching mechanism is closed, and a locking bolt interposed between the starting member and the connecting rod, said starting member having a cam surface engaged at all times by the locking bolt for governing the position of said bolt, the connecting rod including a keeper portion that is engageable by the locking bolt, whereby the closing of the door latching mechanism shifts the connecting rod causing the intermediate member to engage and move the starting member so as to energize the timer motor and initiate the programmed cleaning cycle, the intermediate member including a retracting member that is capable of engagement with the starting member for recocking or reversing the timer upon opening the door latching mechanism at any time during a short time interval at the beginning of the cycle, once the said short time interval has elapsed the cam surface of the starting member forcing the locking bolt into the keeper portion of the connecting rod so as to prevent the unlocking of the door, the said cam surface withdrawing the locking bolt just prior to the termination of the cleaning cycle and the de-energization of the timer.

3. A high temperature oven for domestic use comprising a cabinet structure enclosing a box-like oven liner that has an open front that is adapted to be closed by an access door, where the oven liner and door define an oven cooking cavity, means for supplying heat energy into the oven cavity for normal cooking operations between about 150° F. and 550° F. as well as for a heat cleaning operation having a maximum temperature somewhere between about 750° F. and 950° F. for removing food soil lodged on the walls of the oven cavity, and door latching mechanism movable between open and closed positions for holding the door closed during the heat cleaning operation, safety means for insuring the latching of the access door before the heat cleaning cycle can be initiated, said safety means including an electric motor-driven program timer for governing the supply of heat energy to the oven cavity, a first means operated by the closing of the door latching mechanism for starting the operation of the timer, said first means including a retracting device for optionally resetting the timer during an initial short interval of time upon the opening of the door latching mechanism, a second means operated by the timer and engageable with the door latching mechanism after the said short interval of time so as to disable the door latching mechanism and prevent the mechanism from being opened, said timer terminating the supply of heat energy to the oven cavity and withdrawing the said second means from the door latching mechanism after a sufficient cool-down period and prior to the time the timer itself becomes de-energized so that the door latching mechanism may be moved to an open position.

References Cited by the Examiner
UNITED STATES PATENTS

| 3,113,200 | 12/1963 | Hurko | 219—409 |
| 3,121,158 | 2/1964 | Hurko | 219—397 |
| 3,214,567 | 10/1965 | Chisholm | 219—413 |

RICHARD M. WOOD, *Primary Examiner.*

ANTHONY BARTIS, *Examiner.*

C. L. ALBRITTON, *Assistant Examiner.*